Patented Jan. 29, 1924.

1,482,276

UNITED STATES PATENT OFFICE.

WILLIAM E. STOKES, OF ROCKVILLE CENTER, NEW YORK, ASSIGNOR TO UNITED STATES PROCESSES, INC., OF NEW YORK, N. Y., A CORPORATION OF NEW YORK.

PROCESS OF RECOVERING VANADIUM.

No Drawing.    Application filed February 8, 1921.    Serial No. 443,415.

*To all whom it may concern:*

Be it known that I, WILLIAM E. STOKES, a citizen of the United States of America, residing in Rockville Center, county of Nassau, and State of New York, have invented certain new and useful Improvements in Processes of Recovering Vanadium, of which the following is a specification.

This invention relates to processes of recovering vanadium from ores, and aims to provide improvements therein.

The invention provides a process wherein the difference between the solubility of the vanadium compound in hot and cold solutions, may be utilized for the precipitation or separation of the vanadium compound from its solution.

The invention further provides a process wherein an inexpensive reagent (sodium sulphate, or sodium hydrogen sulphate) may be employed for converting or transposing the vanadium compound of the ore, to a soluble vanadium compound.

The invention further provides a process wherein the reaction between the vanadium compound in the ore and reagent for converting or transposing the vanadium to a soluble compound may be carried out at a relatively low temperature, with consequent economy of fuel.

According to the present invention, the vanadium compound in the ore (roscoelite, for example,) is converted to a soluble vanadium sulphate. This may be advantageously effected by heating the ore (crushed) with an alkali-metal sulphate, or an alkali-metal acid sulphate. The vanadium sulphate is very soluble in cold water, and insoluble in hot water, and, accordingly, advantage may be taken of this property to effect the separation or isolation of the vanadium compound in solid form. To this end the heated ore mixture may be allowed to cool and then leached with water, acidulated (with sulphuric acid, for example), or not, as may be preferred.

The solution containing the vanadium sulphate may now be heated, and the vanadium sulphate being insoluble, will be precipitated.

The recovery of the vanadium compound from the solution, however, may be effected by any other desired method.

Of the alkali-metal sulphates and alkali-metal acid sulphates, sodium acid sulphate, so called nitre-cake, of commerce, is commercially available in large quantities and at small cost, and is preferably used for converting or transposing the vanadium in the ore, to a soluble compound. The use of the alkali-metal acid sulphate, particularly nitre-cake, has the great advantage that the reaction with the vanadium in the ore may be effected at a relatively low temperature; in the neighborhood of 300° C., in contrast with minimum temperatures of 750° C. upward employed in processes now commonly employed for transposing the vanadium in ores. It will be thus perceived that a large saving may be effected, by the use of the present invention, in the cost of the heat or fuel used.

An example of a particular mode of carrying out the invention, is as follows:

To the ore, preferably crushed, 15 per centum, more or less, by weight of sodium acid sulphate (commercial nitre-cake) is mixed, and the mixture heated. Conveniently the temperature need not be carried above 300° C. or thereabout.

After heating, the mixture is then allowed to cool to ordinary temperatures, as by being allowed to stand.

The mixture is then leached with cold water (acidulated if desired), and the solution, containing the soluble vanadium sulphate, is then run off to a tank and neutralized, if necessary, due to the use of an acid leach water. Moreover, to secure complete precipitation it may be desirable to oxidize the leach water. The solution is then heated, conveniently to boiling temperature, at which temperature practically all of the vanadium sulphate is precipitated. The solution is then filtered, and the vanadium sulphate recovered as a solid salt, in which form the vanadium salt may be marketed, or it may be converted to another salt, in any desired manner.

The invention may be carried out in other particular modes than that specifically described, and parts or steps of the process may be practiced independently.

What is claimed is:

1. In a process of recovering vanadium, forming a cold water soluble vanadium compound relatively insoluble in hot water, leaching with cold water, and heating to precipitate the vanadium compound.

2. In a process of recovering vanadium, leaching a vanadium sulphate with cold water, and heating the solution to a temperature at which the vanadium sulphate is precipitated.

3. In a process of recovering vanadium, heating a vanadium ore with an alkali-metal sulphate, leaching with cold water, and heating the solution to a temperature at which the vanadium sulphate is precipitated.

4. In a process of recovering vanadium, heating a vanadium ore with an alkali-metal acid sulphate, leaching with cold water, and heating the solution to a temperature at which the vanadium sulphate is precipitated.

5. In a process of recovering vanadium, heating a vanadium ore with nitre cake, leaching with cold water, and heating the solution to a temperature at which the vanadium sulphate is precipitated.

6. In a process of recovering vanadium, heating a vanadium ore with nitre-cake, at a temperature in the neighborhood of 300° C., leaching with cold water, and heating the solution to a temperature at which the vanadium sulphate is precipitated.

In witness whereof, I have hereunto signed my name.

WILLIAM E. STOKES.